US008990066B2

(12) United States Patent
Chalabi et al.

(10) Patent No.: US 8,990,066 B2
(45) Date of Patent: Mar. 24, 2015

(54) RESOLVING OUT-OF-VOCABULARY WORDS DURING MACHINE TRANSLATION

(75) Inventors: Achraf Chalabi, Cairo (EG); Ahmed Said Morsy, Cairo (EG); Hany Awadalla, Redmond, WA (US); Mohamed El-Sharqwi, Cairo (EG); Sayed Hassan, Cairo (EG)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 13/362,595

(22) Filed: Jan. 31, 2012

(65) Prior Publication Data

US 2013/0197896 A1     Aug. 1, 2013

(51) Int. Cl.
*G10L 15/00* (2013.01)
*G06F 17/27* (2006.01)
*G06F 17/28* (2006.01)

(52) U.S. Cl.
CPC ........ *G06F 17/2735* (2013.01); *G06F 17/2755* (2013.01); *G06F 17/2872* (2013.01)
USPC .................................................. 704/2; 704/8

(58) Field of Classification Search
None
See application file for complete search history.

(56) References Cited

U.S. PATENT DOCUMENTS

2005/0055200 A1    3/2005  Park
2007/0150257 A1*   6/2007  Cancedda et al. ................ 704/2
2008/0154577 A1*   6/2008  Kim et al. ......................... 704/2
2010/0070261 A1    3/2010  Jin et al.
2011/0040552 A1*   2/2011  Van Guilder et al. ............. 704/4
2011/0202330 A1*   8/2011  Dai et al. .......................... 704/2
2012/0316862 A1*  12/2012  Sultan et al. ...................... 704/4

OTHER PUBLICATIONS

Dixit et al, "Design and Implementation of a Morphology-based Spellchecker for Marathi, an Indian Language," Human Language Technologies as a challenge for Computer Science and Linguistics, Poland, vol. 15, Issue No. 3, Apr. 21-23, 2005, 6 pages.
Gangadharaiah et al, "Monolingual Distributional Profiles for Word Substitution in Machine Translation," Proceedings of the 23rd International Conference on Computational Linguistics, COLING '10, Beijing, China, Aug. 23-27, 2010, 9 pages.

(Continued)

*Primary Examiner* — Daniel D Abebe
(74) *Attorney, Agent, or Firm* — Stephen A. Wright; Judy Yee; Micky Minhas

(57) ABSTRACT

Some implementations provide techniques and arrangements to perform automated translation from a source language to a target language. For example, an out-of-vocabulary word may be identified and a morphological analysis may be performed to determine whether the out-of-vocabulary word reduces to at least one stem. If the out-of-vocabulary word reduces to a stem, the stem may be translated. The translated stem may be inflected if the out-of-vocabulary word is inflected. If the out-of-vocabulary word has any affixes, the affixes may be translated. In some cases, the translated affixes may be reordered before being combined with the inflected and translated stem. If the out-of-vocabulary word is misspelled, the spelling of the out-of-vocabulary word may be corrected before performing the morphological analysis. If the out-of-vocabulary word is a colloquial form of a formal word, the out-of-vocabulary word may be replaced with the formal word before performing the morphological analysis.

20 Claims, 9 Drawing Sheets

(56) References Cited

OTHER PUBLICATIONS

Habash et al, "Automatic Learning of Morphological Variations for Handling Out-of-Vocabulary Terms in Urdu-English Machine Translation," In Proceedings of the Association for Machine Translation in the Americas (AMTA-2008), Waikiki, Hawaii, Oct. 21-25, 2008, 10 pages.

Habash, "REMOOV: A Tool for Online Handling of Out-of-Vocabulary Words in Machine Translation," In Proceedings of the 2nd International Conference on Arabic Language Resources and Tools (MEDAR), Cairo, Egypt, Apr. 22-23, 2009, pp. 217-220.

Jawaid et al, "Word-Order Issues in English-to-Urdu Statistical Machine Translation," The Prague Bulletin of Mathematical Linguistics (PBML) No. 95, Apr. 2011, pp. 87-106.

Toutanova et al, "Applying Morphology Generation Models to Machine Translation," In Proceedings of ACL-08: HLT, Columbus, Ohio, Jun. 2008, 9 pages.

* cited by examiner

US 8,990,066 B2

RESOLVING OUT-OF-VOCABULARY WORDS DURING MACHINE TRANSLATION

BACKGROUND

To enable a computer-based translator to translate words or phrases from a source language to a target language, the computer-based translator may be trained using a training set that includes pre-translated sentences. The training set may provide the translation algorithm with a translation vocabulary. However, while the computer-based translator may be effective at translating words or phrases that are included in the translation vocabulary, the computer-based translator may be unable to translate words or phrases that are not included in the translation vocabulary. A word that is not included in (e.g., excluded from) the training set may be referred to as an out-of-vocabulary (OOV) word.

When a computer-based translator encounters an out-of-vocabulary word, the out-of-vocabulary word may be transliterated because a translation corresponding to the out-of-vocabulary word is unavailable. However, an individual who is unfamiliar with the source language may be unable to determine the meaning of the transliterated out-of-vocabulary word, particularly when the out-of-vocabulary word is not a proper name.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations provide techniques and arrangements to perform automated translation from a source language to a target language. For example, when one or more words are received for translation, an out-of-vocabulary word may be identified and a morphological analysis may be performed to determine whether the out-of-vocabulary word could be reduced to a stem. If the out-of-vocabulary word is reduced to a stem, the stem may be translated. The translation of the stem may be inflected if the source language out-of-vocabulary word was originally inflected. If the out-of-vocabulary word had any affixes, the affixes may be translated. In some cases, the translations of the affixes may be reordered before being combined with the inflected translation of the source language stem. If the out-of-vocabulary word is misspelled, the spelling of the out-of-vocabulary word may be corrected before performing the morphological analysis. If the out-of-vocabulary word is a colloquial form of a formal word, the out-of-vocabulary word may be converted to the formal word before performing the morphological analysis.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Example Architectures

Figure 1:
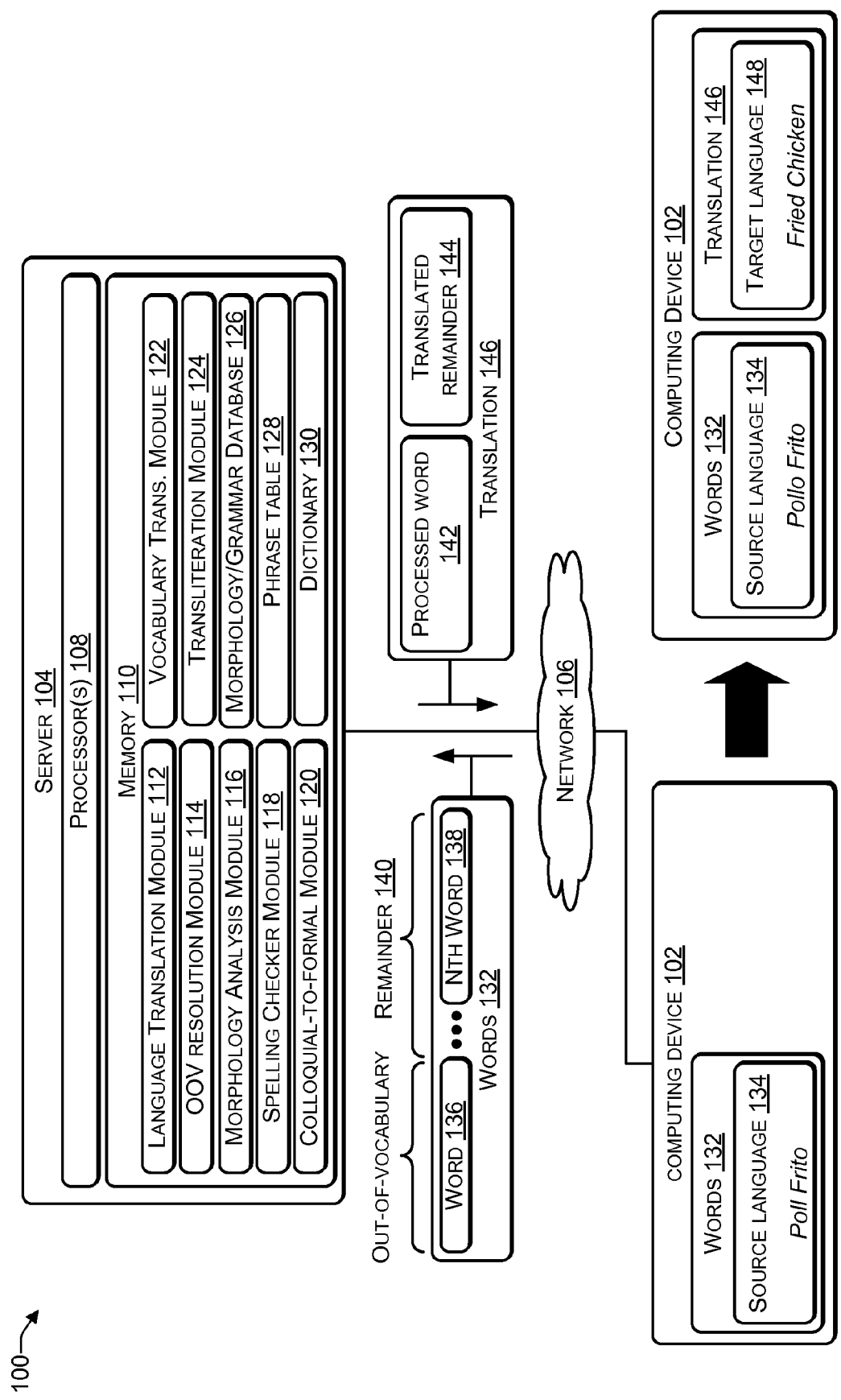
FIG. 1 illustrates an example framework for translating words from a source language to a target language according to some implementations.

Machine translation refers to a computer-implemented translation of text from a first language (referred to as a source language) to a second language (referred to as a target language.) For example, machine translation may be used to translate language text from a source language (e.g. English) into a target language (e.g., Arabic). One approach to implementing a machine translation system is statistical machine translation (SMT). An SMT system may be use a phrase table and a language model to translate sentences from the source language to the target language. The phrase table is a collection of aligned phrase pairs, with each phrase pair consisting of a source language phrase and a corresponding target language phrase. Each phrase may be composed of one or more tokens. Each phrase pair may have an associated set of probabilities. The SMT may be trained using training data. The training data may include pre-translated data, e.g., words and phrases (e.g., a phrase may include two or more words) in the source language and their corresponding translations. The training may provide the SMT with a vocabulary of words and phrases. Because a word or a phrase may have more than one meaning, the vocabulary may include a confidence level (e.g., a probability) associated with each of the possible meanings of the word or the phrase. For example, the vocabulary may indicate that a first translation has an associated ninety-percent confidence level, a second translation has an associated eighty-five percent confidence level, and so on. The automated translator may select a particular translation from the vocabulary based on the confidence level. In some cases, the automated translator may select a particular translation based on an analysis of a context associated with the word or the phrase. For example, when translating a particular word or a particular phrase in a sentence, the automated translator may analyze other words or other phrases that occur before and/or after the particular word or the particular phrase to determine the context of the particular word or the particular phrase. In this example, the automated translator may select a translation from the vocabulary based on the associated confidence level and based on the context.

At runtime, during actual translation, the source language is segmented, based on segments that are found in the phrase table. Typically, more than one possible segmentation hypothesis is generated. For each of the possible segmentation hypotheses, each segment may be translated into one or more translations that are provided by the phrase table. A reordering model may be used to generate possible reordering alternatives of the target translations. Possible sentence translations may be generated based on the different segmentations, phrase translations, and reordering alternatives, and presented to a decoder. The decoder may use a target language model to identify the most likely paths, and generate a ranked list of possible translations. Typically, phrase pairs may be learned through automatic alignment of manually translated source language sentences. The translation accuracy may vary based on the coverage of the phrase table, which in turn varies based on the size of the training data. The training data includes parallel sentences, e.g., sentences in the source language and corresponding (e.g., parallel) sentences in the target language. Words not seen in the training data may not appear in the phrase table. The words that are not included in the training data are referred to as out-of-vocabulary (OOV) words. The accuracy of an SMT system may increase when the number of OOV words are reduced, and the number of OOV words may be reduced by increasing the number of parallel sentences. Conversely, when the available amount of parallel sentences for training is limited, the amount of OOV words may increase, and the accuracy of the SMT system may be reduced. However, increasing the number of parallel sentences in the training data is costly in terms of time and effort because creating a large amount of training data involves human translation of millions of sentences. Described herein are techniques and systems to resolve OOV words using a reasonable amount of training data that does not involve increasing the size of the training data. Though the automated translator may be effective at translating words or phrases that are included in the phrase table, the automated translator may be unable to translate words or phrases that are not included in the phrase table. A word that is not included in (e.g., excluded from) the phrase table may be referred to as an out-of-vocabulary word. Out-of-vocabulary words may be categorized into various categories, such as misspelled common words (e.g., words or phrases that are included in the dictionary or phrase table but are out-of-vocabulary due to their misspelling), colloquial words, inflected common words, and proper names. Each category may be addressed differently. For example, a spelling checker or other similar software program may be used to correct a spelling of a misspelled valid word. If an out-of-vocabulary word is a colloqial form of a formal word, the colloquial form may be replaced with the formal form of the word. If an out-of-vocabulary word is a proper name, the proper name may be transliterated.

An inflected valid word may be a word whose stem is included in the vocabulary but some or all of the inflected forms of the word may be absent (e.g., excluded) from the vocabulary. For example, the words "punching", "punched", and "punches" may be excluded from a vocabulary but the stem, "punch," may be included in the vocabulary. To address out-of-vocabulary words that are inflected valid words, a morphological analysis may be performed to reduce the inflected valid words to their stems. For example, affixes (e.g., prefixes, suffixes, or both) may be removed from an inflected valid word to identify a stem. To illustrate, the affix "ing" may be removed from "punching," the affix "ed" may be removed from "punched," or the affix "es" may be removed from "punches" to identify the stem "punch." In many languages, the number of stem words may be relatively small compared to the number of inflections that may be created using the stem words. Generally, a vocabulary may be more likely to include a stem of an inflected valid word rather than the inflected valid word itself. After the stem is identified, the stem may be translated, either through the phrase table or through a separate dictionary. If any affixes were removed, the affixes may also be translated. In some cases, the translated affixes may be re-ordered based on a grammar of the target language, based on the language pair under translation, or both. The translated (and in some cases re-ordered) affixes may then be combined with the translated stem to create a translated word that corresponds to the out-of-vocabulary word (e.g., the inflected valid word).

Thus, an automated translator may be used to translate one or more words. The automated translator may translate at least one of the one or more words using, various data sets, such as a dictionary and a phrase table. When the automated translator encounters an out-of-vocabulary word, the automated translator may correct the spelling of a misspelled out-of-vocabulary word, replace an out-of-vocabulary word that is a colloquial form of a formal word with the formal word, transliterate an out-of-vocabulary word that is a proper name, or identify a stem of an out-of-vocabulary word and then translate and reinflect the generated stem in the target language.

Automated Translation Framework

FIG. 1 illustrates an example framework 100 for translating words from a source language to a target language according to some implementations. The framework 100 may be executed by a computing device or other particular machine specifically configured with processor-executable instructions, as discussed additionally below.

The framework 100 includes a computing device coupled to a server 104 via a network 106. The network 106 may include one or more networks that use a variety of technologies, such as wireline technologies (e.g., plain ordinary telephone service (POTS), digital subscriber line (DSL), asynchronous transfer mode (ATM), internet protocol (IP), data over cable service interface specification (DOCSIS), and the like), wireless technologies (e.g., code division multiple access (CDMA), global system for mobile (GSM), universal mobile telephone service (UMTS), WiFi®, Bluetooth®, WiMax® and the like), other communication technologies or any combination thereof.

The server 104 may include one or more processors 108 and a memory 110. The memory 110 may include a machine translation system (e.g., an automated translator), which includes one or more modules, such as a language translation module 112, an out-of-vocabulary (OOV) resolution module 114, a morphology analysis module 116, a spelling checker module 118, a colloquial-to-formal module 120, a vocabulary translation module 122, and a transliteration module 124. The memory 110 may also be used to store data, such as a morphology/grammar database 126, phrase table 128, and a dictionary 130. The server 104 may include a computer-based translator that provides automated (e.g., without human interaction) translation services, such as cloud-based or network-based translation services to computing devices, such as the computing device 102.

In operation, the server 104 may receive, from a computing device (e.g., the computing device 102), text comprising one or more words 132 in a source language 134 for translation into at least one other language that is different from the source language. The one or more words 132 may include at least one out-of-vocabulary word 136. In some cases, the words 132 may also include N additional words, up to and including an Nth word 138, where N is one or more. The out-of-vocabulary word 136 may be a particular word that is excluded from the phrase table 128 associated with the language translation module 112. While the out-of-vocabulary word 136 is illustrated as the first of the words 132, the out-of-vocabulary word 136 may be located anywhere (e.g., second word, third word, penultimate word, last word, and the like) within the words 132.

The language translation module 112 may initiate translation of the words 132 based on the phrase table 128. When the out-of-vocabulary word 136 is encountered, the OOV resolution module 114 is called to resolve the out-of-vocabulary word 136 while the language translation module 112 translates a remainder 140 of the words 132. In some implementations, the OOV translation module 114 may resolve the out-of-vocabulary word 136 in parallel (e.g., substantially contemporaneously) with the language translation module 112 translating a remainder 140 of the words 132.

The OOV resolution module 114 may use the morphology analysis module 116 to perform a morphological analysis of the out-of-vocabulary word 136 to determine if the out-of-vocabulary word 136 may be reduced to a stem word. For example, the morphology analysis module 116 may reduce words based on the same stem, such as "punching", "punched", and "punches", to the stem "punch." If the out-of-vocabulary word 136 reduces to a stem word, the language translation module 112 may translate the stem word from the source language 134 to a target language to generate one or more translated stem words. If the out-of-vocabulary word 136 is an inflected word, each of the translated stems may be inflected based on a morphology and grammar database 126 of the target language. If the out-of-vocabulary word 136 includes any affixes (e.g., prefixes, suffixes, or both), the affixes may be translated to the target language. In some cases, based on the syntax and/or morphology of the target language (e.g., the morphology/grammar database 126), the translated affixes may be re-ordered. If the out-of-vocabulary word 136 includes affixes, the translated affixes may be combined with the translated stem to create a processed word 142 that corresponds to the out-of-vocabulary word 136.

The OOV resolution module 114 may use the spelling checker module 118 to determine whether the out-of-vocabulary word 136 is misspelled. If the out-of-vocabulary word 136 is misspelled, the spelling checker module 118 may correct a spelling of the word 136 and determine if the corrected word is in the dictionary 130. For example, the spelling checker module 118 may correct the spelling of one of the words 132 from "poll" to the Spanish word "pollo" for chicken. If the correctly spelled word is included in the dictionary 130, the corresponding one or more translations are fetched from the dictionary 130. If the correctly spelled word is not included in the dictionary 130, the morphology analysis module 116 may perform a morphological analysis of the correctly spelled word to determine if the correctly spelled word may be reduced to a stem word. If the morphology analysis module 116 reduces the correctly spelled word to a stem word, one or more translations for the resulting stem word are fetched from the dictionary 130. If the correctly spelled word is an inflected word, each of the translated stems may be inflected based on a morphology/grammar database 126 of the target language. If the out-of-vocabulary word 136 includes any affixes (e.g., prefixes, suffixes, or both), the affixes may be translated to the target language. In some cases, based on the syntax and/or morphology of the target language, the translated affixes may be re-ordered (e.g., using the morphology/grammar database 126). If the out-of-vocabulary word 136 includes affixes, the translated affixes may be combined with the translated stem to create a synthesized word 142 that corresponds to the out-of-vocabulary word 136.

The OOV resolution module 114 may use the colloquial to formal module 120 to determine whether the out-of-vocabulary word 136 is a colloquial form of a formal word. If the out-of-vocabulary word 136 is a colloquial form of a formal word, colloquial to formal module 120 may replace the out-of-vocabulary word 136 with the formal word and determine if the formal word is included in the phrase table 128. For example, if the word "poll" is a colloquialism for the Spanish word "pollo," the OOV resolution module 114 may replace the colloquialism "poll" with the formal word "pollo." If the formal word is included in the dictionary 130, a translation of the formal word may be selected from the dictionary 130. If the formal word is not included in the dictionary 130, the morphology analysis module 116 may perform a morphological analysis of the formal word to determine if the formal word may be resolved to a stem word. If the morphology analysis module 116 resolves the formal word to a stem word the language translation module 112 may translate the stem word from the source language 134 to a target language to create a translated stem word. If the formal word is an inflected word, each of the translated stems may be inflected based on a morphology/grammar database 126 of the target language. If the out-of-vocabulary word 136 includes any affixes (e.g., prefixes, suffixes, or both), the affixes may be translated to the target language. In some cases, based on the syntax and/or morphology of the target language, the translated affixes may be re-ordered. If the out-of-vocabulary word 136 includes affixes, the translated affixes may be combined with the translated stem to create a synthesized word 142 that corresponds to the out-of-vocabulary word 136.

If the spelling checker module 118 determines that the out-of-vocabulary 136 word is not misspelled, and if the colloquial to formal module 120 determines that the out-of-vocabulary word 136 is not a colloquialism, and if the morphology analysis module is unable to identify a stem of the out-of-vocabulary word 136, or any combination thereof, then the transliteration module 124 may transliterate the out-of-vocabulary word 136. The transliteration module 124 may provide the transliteration of the out-of-vocabulary word 136 as the processed word 142. For example, the language translation module 112 may assume the out-of-vocabulary word 136 is a proper name if the out-of-vocabulary word 136 is not a misspelling, not a colloquialism, and does not reduce to a stem word, and transliterate the out-of-vocabulary word 136.

The language translation module 112 may translate the remainder 140 of the words 132 to create a translated remainder 144. The language translation module 112 may combine the processed word 142 and the translated remainder 144 to create a translation 146 in a target language 148 corresponding to the words 132 in the source language 134. In some instances, the language translation module 112 may, based on a grammar of the target language, re-order the processed word 142 and/or re-order the words in the translated remainder 144 when creating the translation 146. For example, the out-of-vocabulary word "poll" from the words 132 may be resolved to "pollo" and then translated to create "chicken" as the processed word 142. The remainder 140 "frito" may be translated to create the translated remainder 144 "fried." The language translation module 112 may, based on a grammar of the target language (e.g., English), re-order the processed word 142 (e.g., the noun "chicken") and the translated remainder 144 (e.g., the adjective "fried") from "chicken fried" to create the translation 146 "fried chicken."

The server 104 may provide the translation 146 to the computing device 102 that sent the request to translate the words 132 from the source language 134 to the target language 148. For example, the server 104 may provide cloud-based free and/or fee-based translation services to computing devices, including mobile computing devices.

Thus, the computing device may send one or more words 132 in a source language 134 for translation into the target language 148. In response to receiving the words 132, the server 104 may initiate translation of the one or more words 132. If the one or more words 132 include at least one out-of-vocabulary word 136, the OOV resolution module 114 may process the at least one out-of-vocabulary word 136 by correcting the spelling, substituting a formal word for a colloquialism, performing a morphological analysis, transliteration, or any combination thereof to create the processed word 142. At least some of the modules 112, 114, 116, 118, 120, 122 or 124 may operate substantially contemporaneously (e.g., substantially in parallel). For example, the server 104 may process the out-of-vocabulary word 136 to create the processed word 142 substantially contemporaneously with translating the remainder 140 to create the translated remainder 144.

Figure 2:
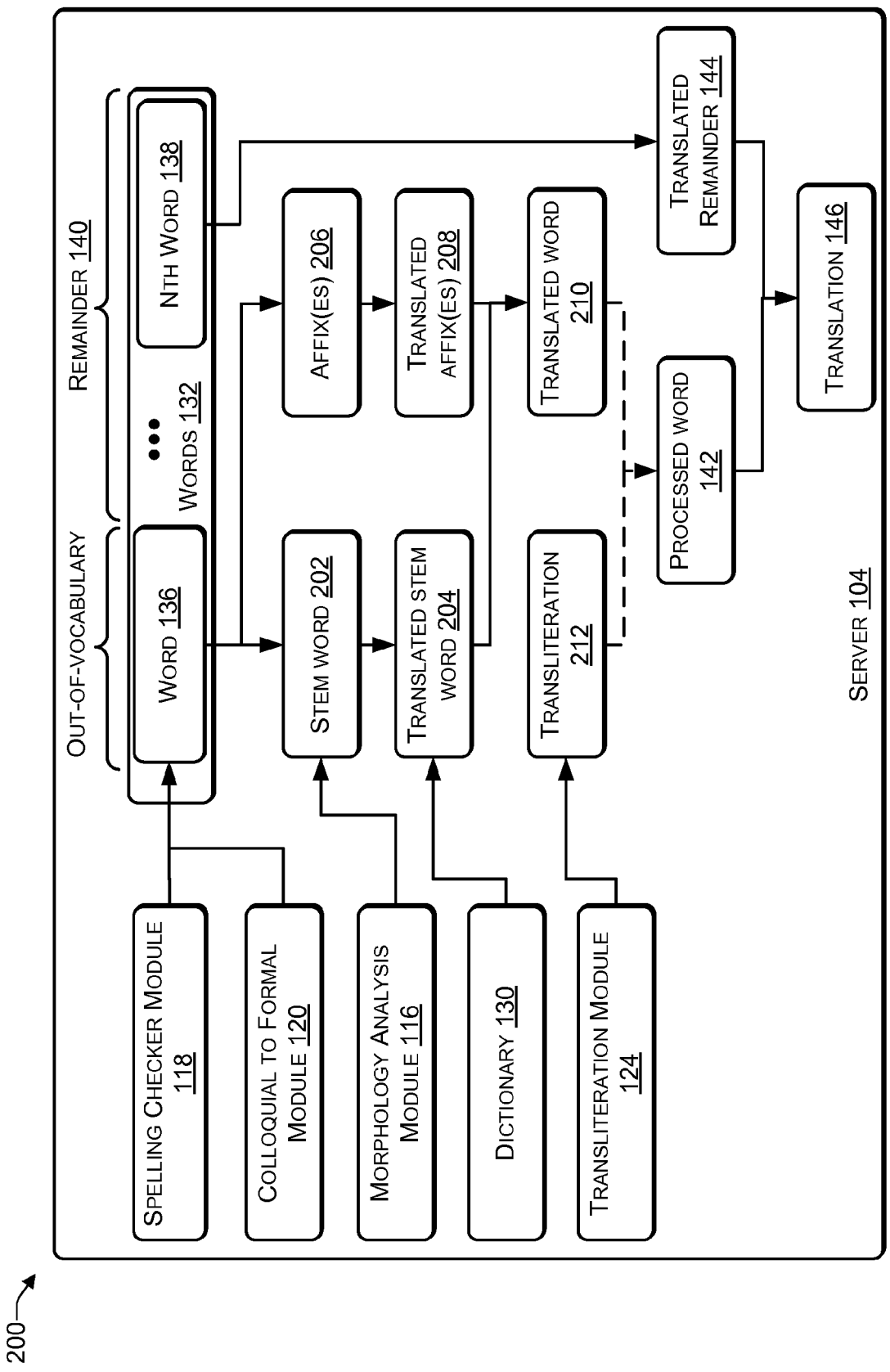
FIG. 2 illustrates an example framework for creating a translation according to some implementations.
Figure 3:
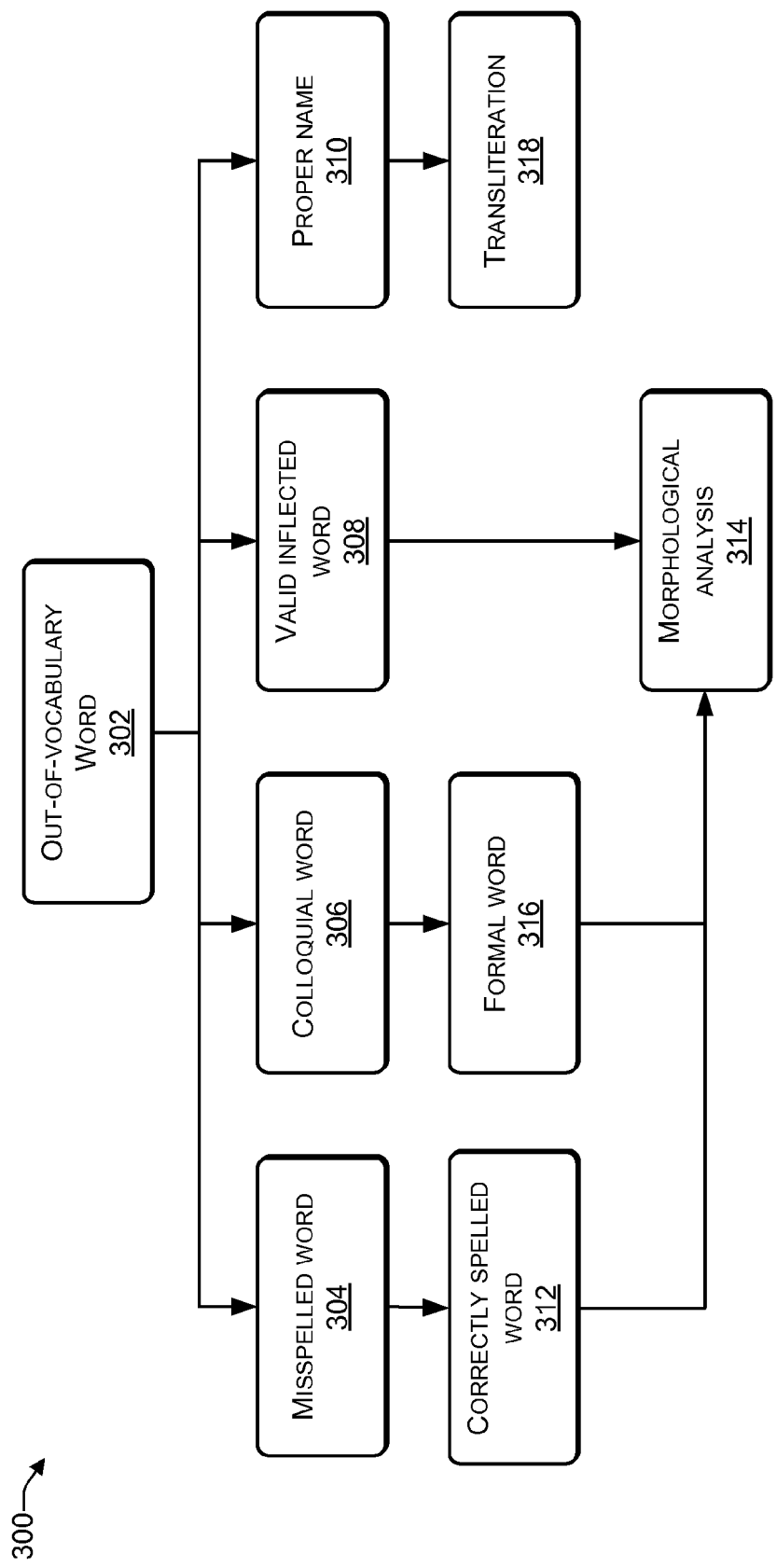
FIG. 3 illustrates an example framework for resolving different types of out-of-vocabulary words according to some implementations.

FIG. 2 illustrates an example framework 200 for creating a translation according to some implementations. The framework 200 illustrates how the server 104 may translate the words 132 to the translation 146.

The server 104 may receive the one or more words 132 for translation from a source language to one or more additional languages that are different from the source language. The one or more words 132 may include the out-of-vocabulary word 136. In some cases, the words 132 may also include N additional words, up to and including the Nth word 138, where N is one or more. The N additional words may be referred to as a remainder 140 of the words 132. The out-of-vocabulary word 136 may be a particular word from the words 132 that is excluded from a vocabulary (e.g., the phrase table 128) of an automated translator that is hosted by the server 104.

When the out-of-vocabulary word 136 is encountered, the out-of-vocabulary word 136 may be processed while the remainder 140 is translated to create the translated remainder 144. For example, the morphology analysis module 116 may perform a morphological analysis of the out-of-vocabulary word 136 to determine if the out-of-vocabulary word 136 may be reduced to a stem word 202 (also known as a root word). If the out-of-vocabulary word 136 resolves to the stem word 202, the stem word 202 may be translated to a target language to create a translated stem word 204. If the out-of-vocabulary word 136 is an inflected word, the translated stem may be inflected based on a grammar (e.g., selected from the morphology/grammar database 126) of the target language.

The spelling checker module 118 may determine whether the out-of-vocabulary word 136 is misspelled. If the out-of-vocabulary word 136 is misspelled, the spelling checker module 118 may correct a spelling of the out-of-vocabulary word 136. If the correctly spelled word is found in the dictionary 130, the dictionary 130 may be used to identify a translation of the correctly spelled word. If the correctly spelled word is not included in the dictionary, the morphology analysis module 116 may perform a morphological analysis of the correctly spelled word to determine if the correctly spelled word resolves to the stem word 202. If the morphology analysis module 116 resolves the correctly spelled word to the stem word 202, the stem word 202 may be translated to create the translated stem word 204. If the correctly spelled word is an inflected word, the translated stem may be inflected based on the morphological rules of the target language.

The colloquial to formal module 120 may determine whether the out-of-vocabulary word 136 is a colloquial form of a formal word. If the out-of-vocabulary word 136 is a colloquial form of a formal word, the colloquial to formal module 120 may replace the out-of-vocabulary word 136 with the formal word and determine if the formal word is included in the dictionary 130. If the formal word is included in the dictionary 130, a translation of the formal word may be selected from the dictionary 130. If the formal word is not included in the dictionary 130, the morphology analysis module 116 may perform a morphological analysis of the formal word to determine if the formal word resolves to the stem word 202. If the morphology analysis module 116 resolves the formal word to the stem word 202, the stem word 202 may be translated to a target language to create the translated stem word 204. If the formal word is an inflected word, the translated stem word 204 may be inflected based on the morphological rules (e.g., using the morphology/grammar database 126) of the target language.

If the out-of-vocabulary word 136 includes one or more affixes 206 (e.g., prefixes, suffixes, or both), the affixes 206 may be translated to the target language to create the translated affixes 208. In some cases, based on the grammar of the target language, the translated affixes 208 may be re-ordered by the language translation module 112. If the out-of-vocabulary word 136 includes the one or more affixes 206, the translated affixes 208 may be combined with the translated stem word 204 to create a translated word 210 that corresponds to the out-of-vocabulary word 136. If the out-of-vocabulary word 136 does not include any affixes, the translated stem word 204 may be provided as the translated word 210 that corresponds to the out-of-vocabulary word 136.

If the spelling checker module 118 determines that the out-of-vocabulary word 136 is not misspelled, if the colloquial to formal module 120 determines that the out-of-vocabulary word 136 is not a colloquialism, if the morphology analysis module is unable to identify a stem of the out-of-vocabulary word 136, or any combination thereof, then the transliteration module 124 may create a transliteration 212 based on the out-of-vocabulary word 136. If the translated word 210 was created, then the translated word 210 may be selected as the processed word 142. If the transliteration 212 was created (e.g., the translated word 210 was not created), then the transliterated word 212 may be selected as the processed word 142.

The remainder 140 of the words 132 may be translated to create the translated remainder 144. The processed word 142 and the translated remainder 144 may be combined to create the translation 146 corresponding to the words 132.

Thus, the server 104 may translate the one or more words 132. The spelling checker module 118 may correct the spelling of the out-of-vocabulary word 136 if the out-of-vocabulary word 136 was misspelled. The colloquial to formal module 120 may substitute a formal form of the out-of-vocabulary word 136 if the out-of-vocabulary word 136 is a colloquialism. The morphology analysis module 116 may perform a morphological analysis of the out-of-vocabulary word 136 to derive the stem word 202. The stem word 202 may be translated and re-inflected to create the translated word 210.

The order in which the modules 116, 118, 120, or 124 process the words 132 may vary depending upon the implementation. For example, in some implementations, at least some of the modules 116, 118, 120, 124, and/or other modules of the server 104 may operate substantially contemporaneously (e.g., in parallel). In some implementations, the modules 116, 118, 120, 124, and/or other modules of the server 104 may operate in a particular order. For example, the morphology analysis module 124 may analyze the out-of-vocabulary word 136 to identify the stem 202. If the morphology analysis module 124 is unable to identify the stem 202, the spelling checker module 118 may determine if the out-of-vocabulary word 136 is misspelled. If the out-of-vocabulary word 136 is misspelled, the spelling may be corrected and the morphology analysis module 124 may analyze the corrected out-of-vocabulary word 136 to identify the stem 202. If the spelling checker module 118 determines that the out-of-vocabulary word 136 is correctly spelled, the colloquial to formal module 120 may determine if the out-of-vocabulary word 136 is a colloquial form of a formal word. If the out-of-vocabulary word 136 is a colloquial form of a formal word, the formal word (e.g., the formal form of the colloquial word) may be substituted for the out-of-vocabulary word 136 and the morphology analysis module 124 may analyze the formal word to identify the stem 202. If the out-of-vocabulary word 136 is not a colloquial form of a formal word, the transliteration module 124 may create the transliteration 210 corresponding to out-of-vocabulary word 136. Of course, in other implementations, the order in which the modules 116, 118, 120, or 124 process the out-of-vocabulary word 136 may vary.

Example Processes

In the flow diagrams of FIGS. 4, 5, 6, 7, and 8, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, 600, 700 and 800 are described with reference to the architectures 100, 200, and 300, as described above, although other models, frameworks, systems and environments may implement these processes.

Figure 4:
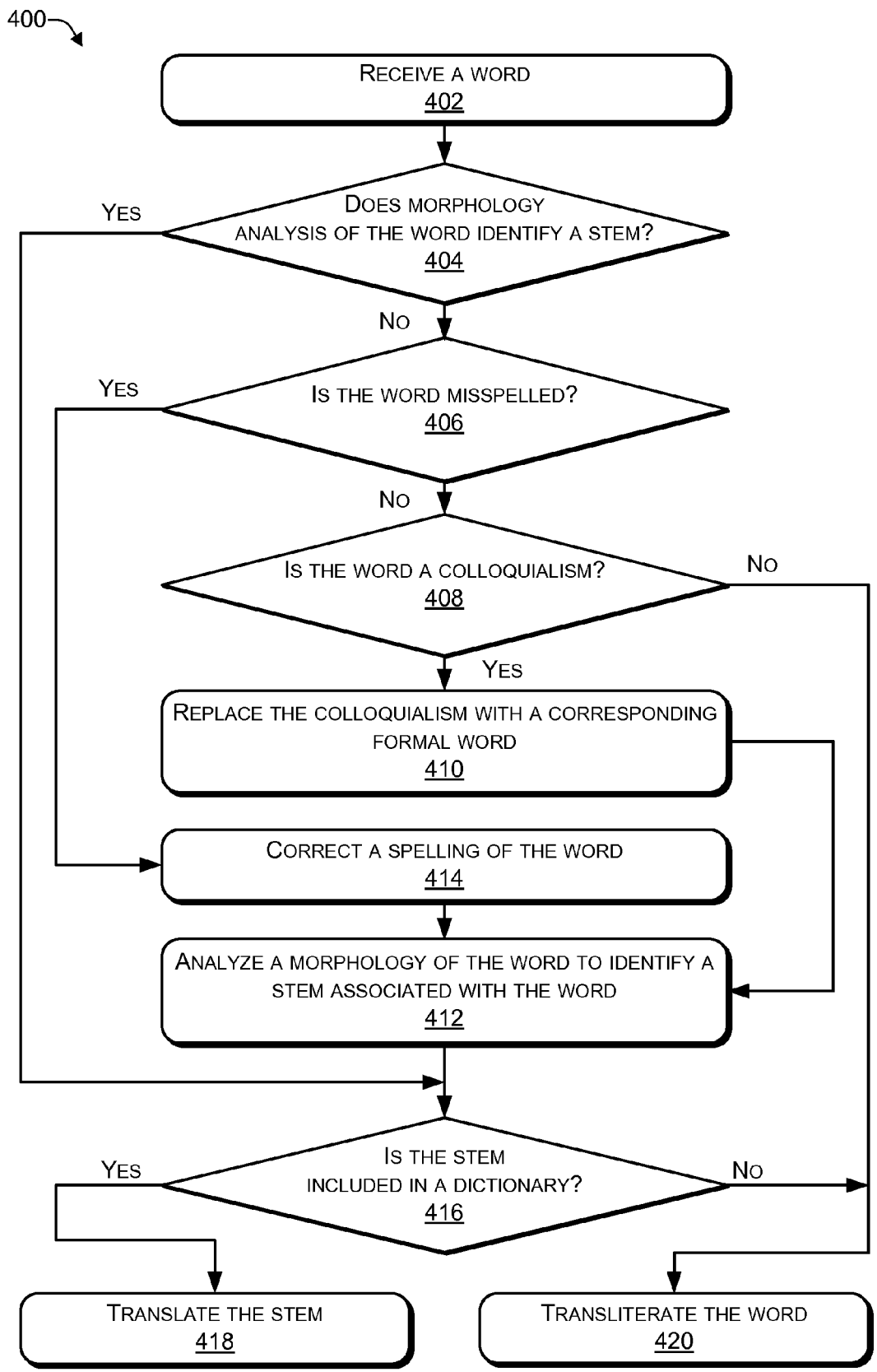
FIG. 4 is a flow diagram of an example process that includes resolving an out-of-vocabulary word according to some implementations.

FIG. 4 is a flow diagram of an example process 400 that includes resolving an out-of-vocabulary word according to some implementations. For example, the process 400 may be performed by one or more modules of an automated translator, such as the language translation module 112 of FIG. 1.

At 402, a word is received. For example, in FIG. 1, the OOV resolution module 114 may receive the out-of-vocabulary word 136 from the language translation module 112 in response to the language translation module 112 encountering the out-of-vocabulary word 136.

At 404, a determination may be made whether a morphology analysis of the word identifies a stem. For example, in FIG. 2, the morphology analysis module 116 may determine whether a morphological analysis of the out-of-vocabulary word 136 identifies the stem 202.

If the morphological analysis of the out-of-vocabulary word is unable to identify the stem, at 404, then a determination may be made whether the word is misspelled, at 406. For example, in FIG. 2, the spelling checker module 118 may determine that the out-of-vocabulary word 136 is misspelled.

In response to determining that the out-of-vocabulary word 136 is correctly spelled, at 406, a determination may be made whether the word is a colloquialism, at 408. For example, the colloquial to formal module 120 may determine whether the out-of-vocabulary word 136 is a colloquial form of a formal word.

In response to determining that the out-of-vocabulary word 136 is a colloquialism, at 408, the colloquialism may be replaced with a corresponding formal word, at 410. For example, in FIG. 2, the colloquial to formal module 120 may replace the out-of-vocabulary word 136 with a formal word that corresponds to the colloquial out-of-vocabulary word 136.

At 412, a morphology of the word may be analyzed to identify a stem associated with the word. For example, in FIG. 2, the morphology analysis module 116 may identify the stem 202 associated with the out-of-vocabulary word 136.

In response to determining that the out-of-vocabulary word 136 is misspelled, at 406, a spelling of the word may be corrected, at 414, and a morphology of the correctly spelled word may be analyzed to identify a stem associated with the word, at 412.

If the stem is identified, at 404 or 412, then a determination may be made whether the stem is in a dictionary, at 416. For example, in FIG. 2, a determination may be made (e.g., by the OOV resolution module 114 of FIG. 1) whether the stem 202 identified by the morphology analysis module 116 is included in the dictionary 130.

If a determination is made that the stem is included in the dictionary, at 416, then the stem may be translated, at 418. For example, in FIG. 2, the stem 202 may be translated to the translated stem word 204 using the dictionary 130. After translating the stem, at 418, other operations may be performed. For example, as illustrated in FIG. 2, if the out-of-vocabulary word 136 has affixes, then the affixes 206 may be translated. The translated affixes 208 may be re-ordered based on the syntax and/or morphology of the target language (e.g., using the morphology/grammar database 126) before the translated stem word 204 is combined with the translated affixes 208 to create the translated word 210.

If a determination is made that the stem is excluded from the dictionary, at 416, then the word may be transliterated, at 420. For example, in FIG. 2, the transliteration module 124 may transliterate the out-of-vocabulary 136 to create the transliteration 210. For example, the out-of-vocabulary 136 may be translated because the out-of-vocabulary 136 may be a proper name.

Thus, an automated translator may translate an out-of-vocabulary word if a morphological analysis of the out-of-vocabulary word identifies a stem. If the out-of-vocabulary word is misspelled, a spelling of the out-of-vocabulary word may be corrected before performing the morphological analysis. If the out-of-vocabulary word is a colloquialism, the out-of-vocabulary word may be replaced with a formal word corresponding to the colloquial out-of-vocabulary word before performing the morphological analysis. If a morphological analysis of the out-of-vocabulary word is incapable of identifying a stem, the out-of-vocabulary word may be transliterated.

Figure 5:
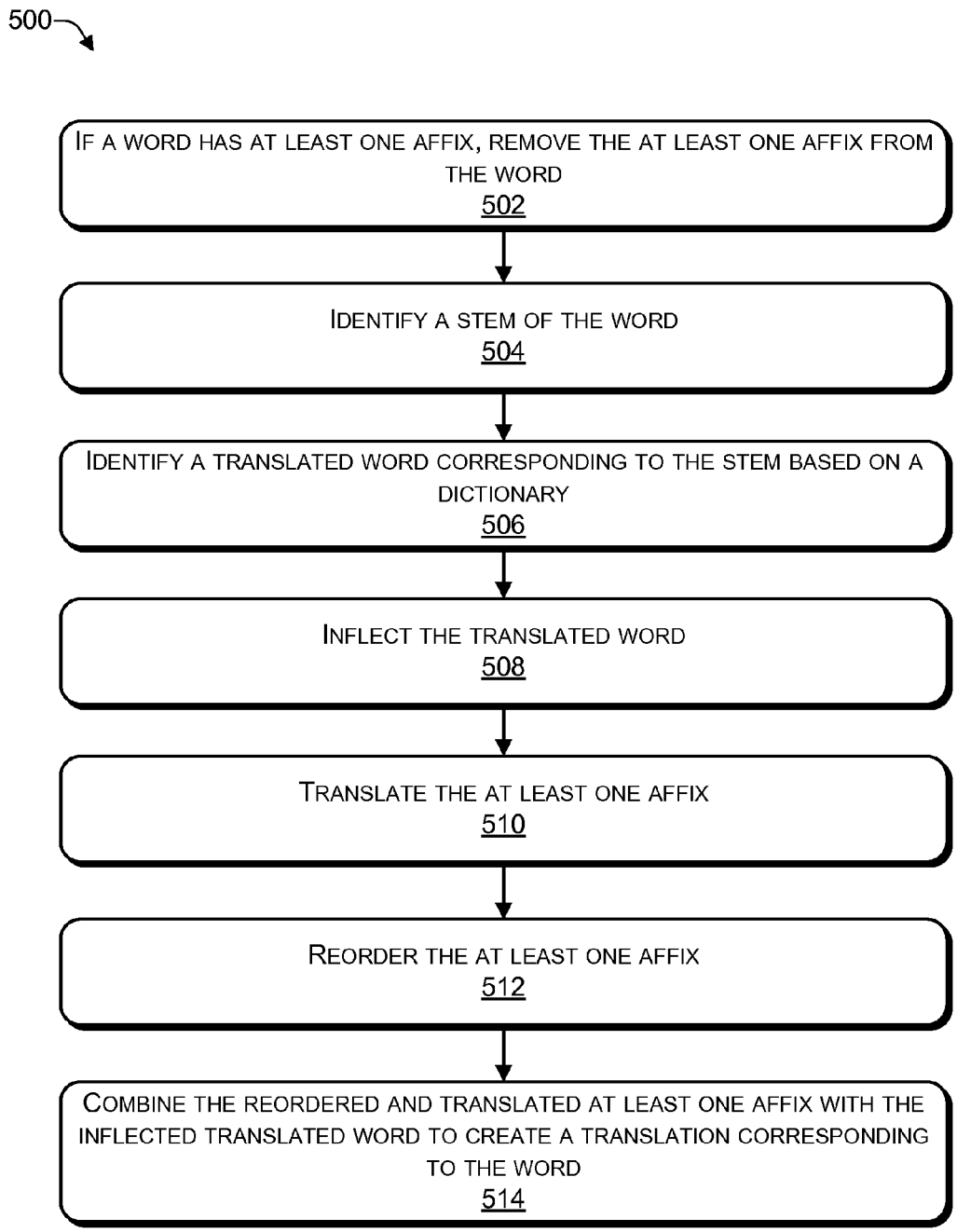
FIG. 5 is a flow diagram of an example process that includes identifying a stem of a word and translating both the stem and at least one affix according to some implementations.

FIG. 5 is a flow diagram of an example process 500 that includes identifying a stem of a word according to some implementations. For example, the process 500 may be performed by one or more modules of an automated translator, such as the language translation module 112 of FIG. 1.

At 502, if a word has at least one affix, the at least one affix may be removed from the word. For example, in FIG. 2, if the out-of-vocabulary word 136 includes the affixes 206, then the affixes 206 may be removed from the out-of-vocabulary word 136.

At 504, a stem of the word may be identified. For example, in FIG. 2, the morphology analysis module 116 may identify the stem 202 of the out-of-vocabulary word 136.

At 506, a translated word corresponding to the stem may be identified based on a dictionary. For example, in FIG. 2, the translated stem word 204 corresponding to the stem 202 may be identified based on the dictionary 130.

At 508, the translated word may be inflected. For example, in FIG. 2, the translated stem word 204 may be inflected if the out-of-vocabulary word 136 was an inflected word.

At 510, the at least one affix may be translated. For example, in FIG. 2, the affixes 206 may be translated (e.g., using the dictionary 130) to create the translated affixes 208.

At 512, the at least one affix may be reordered. For example, in FIG. 2, the translated affixes 206 may be reordered based on the syntax and/or morphology of the target language (e.g., using the morphology/grammar database 126). The morphology/grammar database 126 of FIG. 1 may include the grammar and/or morphology of the target language.

At 514, the at least one affix that has been reordered and translated may be combined with the inflected translated word to create a translation corresponding to the word. For example, in FIG. 2, the translated affixes 208 may be reordered based on the syntax and/or morphology of the target language (e.g., using the morphology/grammar database 126). The translated stem word 204 may be inflected based on the syntax and/or morphology of the target language (e.g., using the morphology/grammar database 126). The translated affixes 208 may be combined with the inflected translated stem word 204 to create the translated word 210.

Figure 6:
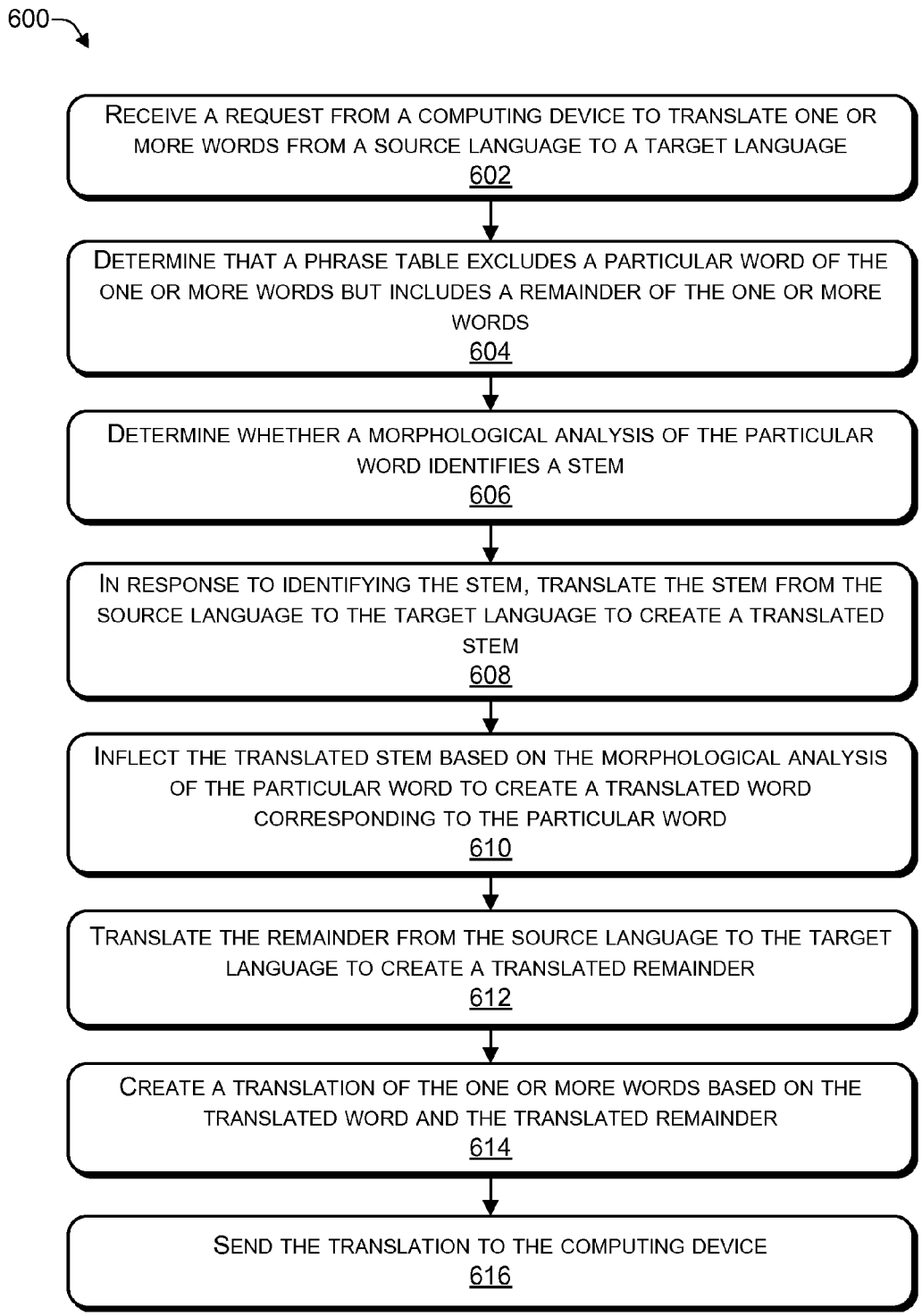
FIG. 6 is a flow diagram of an example process that includes sending a translation to a computing device according to some implementations.

FIG. 6 is a flow diagram of an example process 600 that includes sending a translation to a computing device according to some implementations. For example, the process 600 may be performed by the server 104.

At 602, a request may be received from a computing device to translate one or more words from a first language (e.g., a source language) to a second language (e.g., a target language). For example, in FIG. 1, the server 104 may receive a request to translate the one or more words 132 from the source language 134 to the target language 148.

At 604, a determination may be made that a phrase table excludes a particular word of the one or more words but includes a remainder of the one or more words. For example, in FIG. 1, the language translation module 112 may determine that the word 136 is excluded from the phrase table 128 (e.g., the word 136 is out-of-vocabulary). The language translation module 112 may determine that the phrase table 128 includes the remainder 140 of the words 132.

At 606, a determination may be made whether a morphological analysis of the particular word identifies a stem. For example, in FIG. 2, the morphology analysis module 116 may determine whether a stem associated with the word 136 may be identified.

At 608, in response to identifying the stem, the stem may be translated from the source language to the target language to create a translated stem. For example, in FIG. 2, if the morphology analysis module 116 resolves the out-of-vocabulary word 136 to the stem word 202, the stem word 202 may be translated to create the translated stem word 204 using the dictionary 130.

At 610, the translated stem may be inflected based on the morphological analysis of the particular word to create a translated word corresponding to the particular word. For example, in FIG. 2, if the out-of-vocabulary word 136 is an inflected word, the translated stem word 204 may be inflected based on the morphological analysis of the out-of-vocabulary word 136 to create the translated word 210 that corresponds to the out-of-vocabulary word 136.

At 612, the remainder may be translated from the source language to the target language to create a translated remainder. For example, in FIG. 2, the remainder 140 may be translated to create the translated remainder 144.

At 614, a translation of the one or more words may be created based on the translated word and the translated remainder. For example, in FIG. 2, the translated word 210 may be combined with the translated remainder 144 to create the translation 146 corresponding to the words 132.

Figure 7:
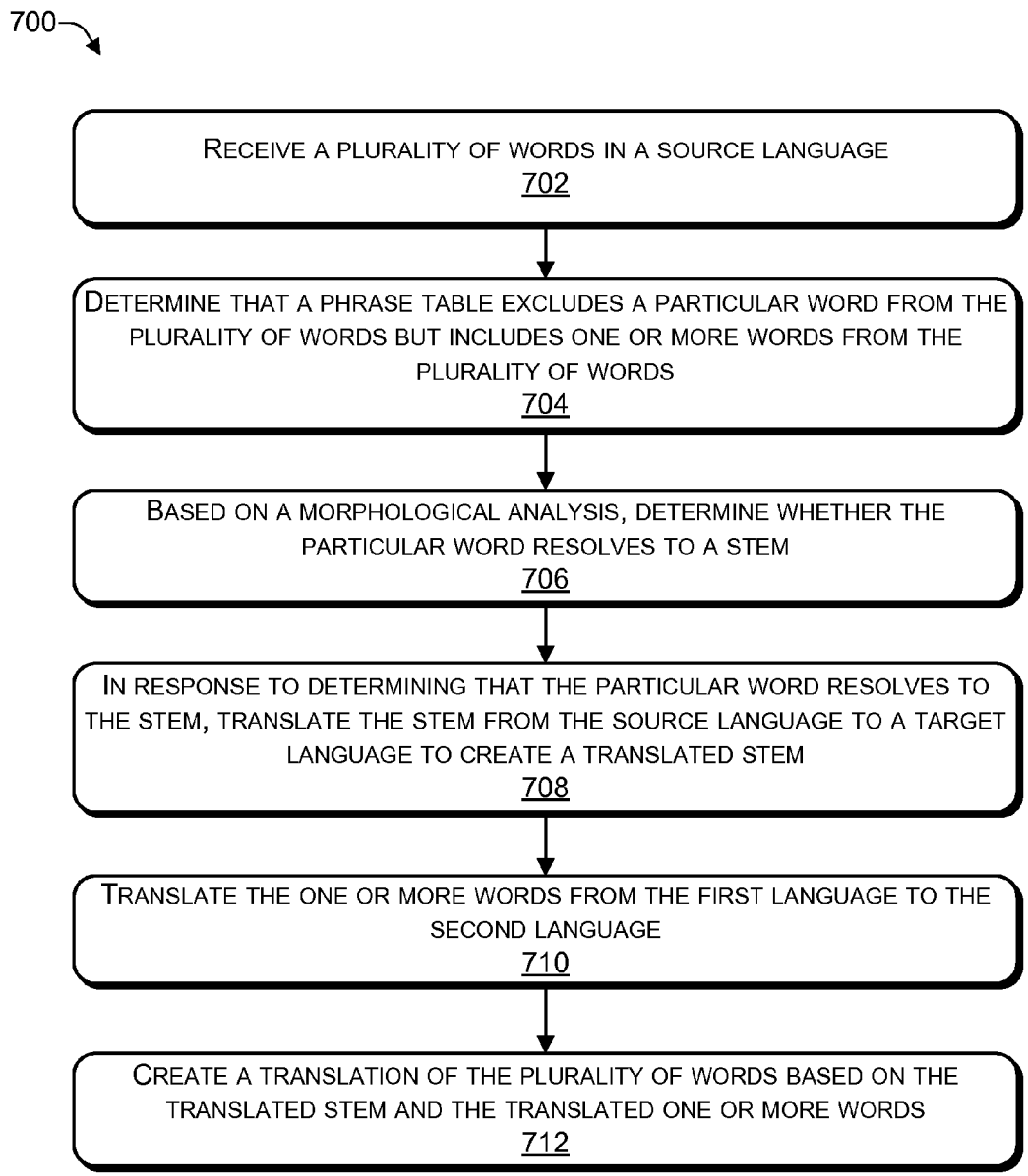
FIG. 7 is a flow diagram of an example process that includes determining whether a word resolves to a stem according to some implementations.

FIG. 7 is a flow diagram of an example process 700 that includes determining whether a word resolves to a stem according to some implementations. For example, the process 700 may be performed by the server 104 of FIG. 1.

At 702, a plurality of words in a source language may be received. For example, in FIG. 1, the server 104 may receive the one or more words 132 in the source language 134 (e.g., a first language) for translation to the target language 148 (e.g., a second language).

At 704, a determination may be made that a phrase table excludes a particular word from the plurality of words but includes one or more words from the plurality of words. For example, in FIG. 1, the language translation module 112 may determine that the word 136 is excluded from the phrase table 128 (e.g., the word 136 is out-of-vocabulary). The language translation module 112 may determine that the phrase table 128 includes the remainder 140 of the words 132.

At 706, based on a morphological analysis, a determination may be made whether the particular word resolves to a stem. For example, in FIG. 2, the morphology analysis module 116 may determine whether the word 136 may be resolved to a stem word (e.g., the stem word 202).

At 708, in response to determining that the particular word resolves to the stem, the stem may be translated from the source language to the target language to create a translated stem. For example, in FIG. 2, if the morphology analysis module 116 resolves the out-of-vocabulary word 136 to the stem word 202, the stem word 202 may be translated to create the translated stem word 204 (e.g., using the dictionary 130).

At 710, the one or more words may be translated from the source language to the target language. For example, in FIG. 2, the remainder 140 may be translated from a source language to a target language to create the translated remainder 144.

At 712, a translation of the plurality of words may be created based on the translated stem and the translated one or more words. For example, in FIG. 2, the translated stem word 204 may be combined with the translated remainder 144 to create the translation 146 corresponding to the words 132.

Figure 8:
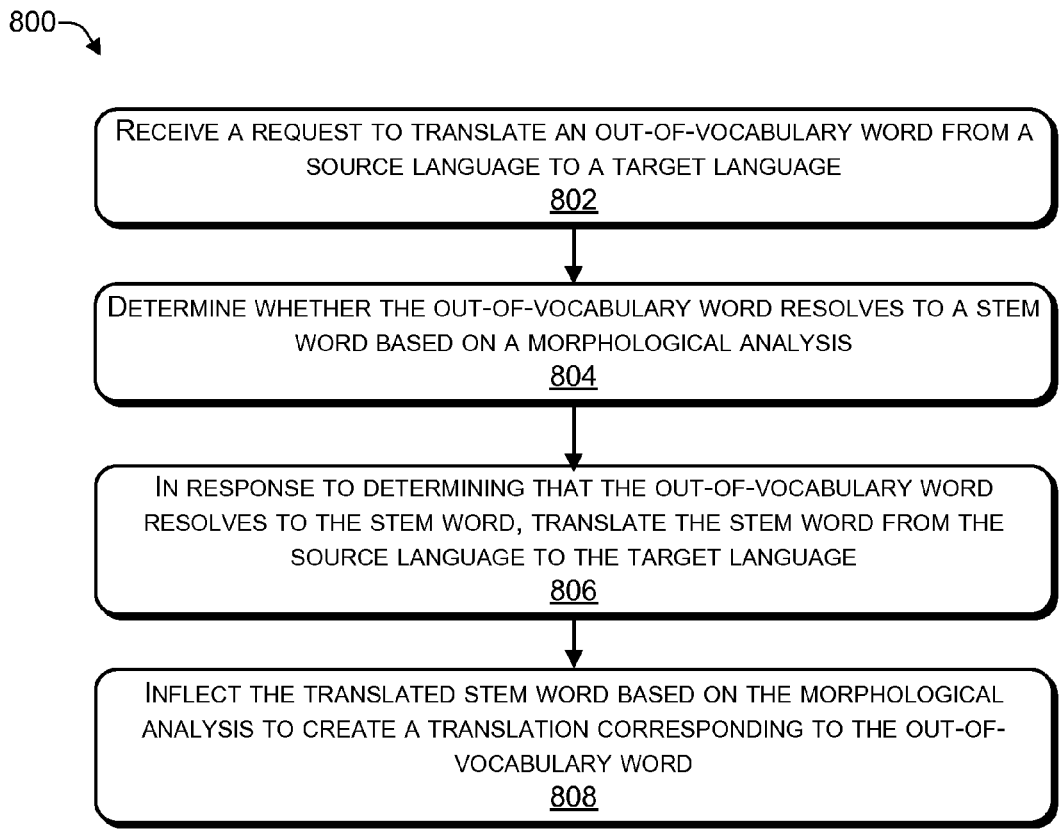
FIG. 8 is a flow diagram of an example process that includes receiving a request to translate an out-of-vocabulary word according to some implementations.

FIG. 8 is a flow diagram of an example process 800 that includes receiving a request to translate an out-of-vocabulary word according to some implementations. For example, the process 800 may be performed by the OOV resolution module 114 of FIG. 1.

At 802, a request to translate an out-of-vocabulary word from a first language (e.g., a source language) to a second language (e.g., a target language) may be received. For example, in FIG. 1, the OOV resolution module 114 may receive a request from the language translation module 112 to translate the out-of-vocabulary word 136.

At 804, a determination may be made whether the out-of-vocabulary word resolves to a stem word based on a morphological analysis. For example, in FIG. 2, the morphology analysis module 116 may determine whether the out-of-vocabulary word 136 resolves to the stem word 202.

At 806, in response to determining that the out-of-vocabulary word resolves to the stem word, the stem word may be translated from the source language to the target language. For example, in FIG. 2, if the morphology analysis module 116 resolves the out-of-vocabulary word 136 to the stem word 202, the stem word 202 may be translated from the source language 134 to the target language 148 to create the translated stem word 204.

At 808, the translated stem may be inflected based on the morphological analysis to create a translation corresponding to the out-of-vocabulary word. For example, in FIG. 2, the translated stem word 204 may be inflected based on the morphological analysis of the out-of-vocabulary word 136 to create the translated word 210. The translated word 210 may correspond to the out-of-vocabulary word 136.

Example Computing Device and Environment

Figure 9:
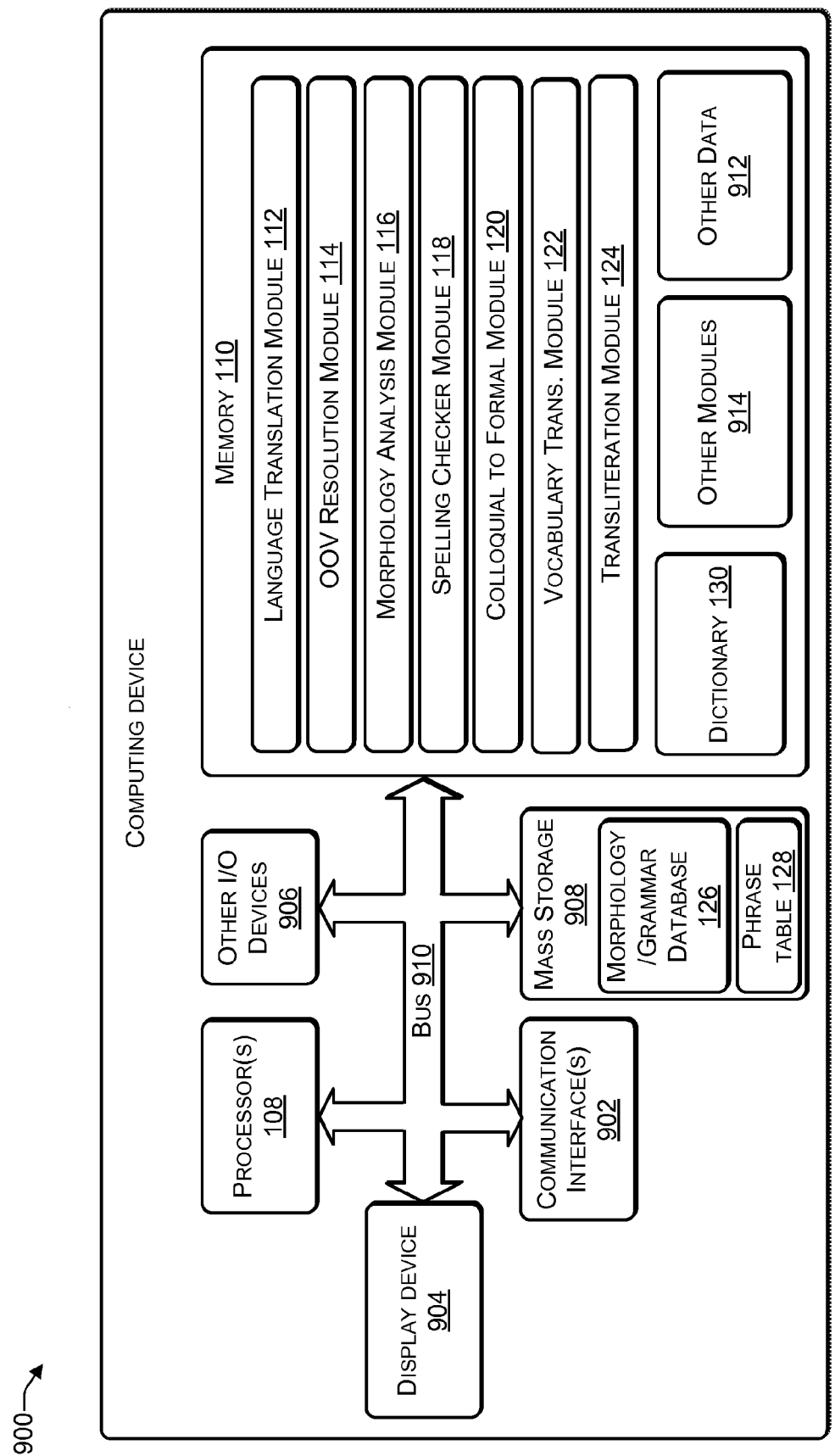
FIG. 9 illustrates an example configuration of a computing device and environment according to some implementations.

FIG. 9 illustrates an example configuration of a computing device 900 and environment that can be used to implement the modules and functions described herein. For example, the server 104 of FIG. 1 may include the computing device 900. The computing device 900 may include the one or more processors 108, the memory 110, communication interfaces 902, a display device 904, other input/output (I/O) devices 906, and one or more mass storage devices 908, able to communicate with each other, such as via a system bus 910 or other suitable connection.

The one or more processors 108 may include a single processing unit or a number of processing units, all of which may include single or multiple computing units or multiple cores. The processors 108 can be implemented as one or more microprocessors, microcomputers, microcontrollers, digital signal processors, central processing units, state machines, logic circuitries, and/or any devices that manipulate signals based on operational instructions. Among other capabilities, the processors 108 can be configured to fetch and execute computer-readable instructions stored in the memory 110, the mass storage devices 908, or other computer-readable media.

The memory 110 and the mass storage devices 908 are examples of computer storage media for storing instructions which are executed by the processors 108 to perform the various functions described above. For example, the memory 110 may generally include both volatile memory and non-volatile memory (e.g., RAM, ROM, or the like). Further, the mass storage devices 908 may generally include hard disk drives, solid-state drives, removable media, including external and removable drives, memory cards, flash memory, floppy disks, optical disks (e.g., CD, DVD), a storage array, a network attached storage, a storage area network, or the like. Both the memory 110 and the mass storage devices 908 may be collectively referred to as memory or computer storage media herein, and may be a non-transitory media capable of storing computer-readable, processor-executable program instructions as computer program code that can be executed by the processors 108 as a particular machine configured for carrying out the operations and functions described in the implementations herein.

The computing device 900 may also include one or more communication interfaces 902 for exchanging data with other devices, such as via a network, direct connection, or the like, as discussed above. The communication interfaces 902 can facilitate communications within a wide variety of networks and protocol types, including wired networks (e.g., LAN, cable, etc.) and wireless networks (e.g., WLAN, cellular, satellite, etc.), the Internet and the like. Communication interfaces 902 can also provide communication with external storage (not shown), such as in a storage array, network attached storage, storage area network, or the like.

A display device 904, such as a monitor may be included in some implementations for displaying information and images to users. Other I/O devices 906 may be devices that receive various inputs from a user and provide various outputs to the user, and may include a keyboard, a remote controller, a mouse, a printer, audio input/output devices, and so forth.

Memory 110 may include modules and components for providing automated (e.g., without human interaction) translation services according to the implementations herein. In the illustrated example, the memory 110 includes the language translation module 112, the OOV resolution module 114, the morphology analysis module 116, the spelling checker module 118, the colloquial to formal module 120, the vocabulary translation module 122, and the transliteration module 124.

Memory 110 may also include other data and data structures described herein, such as the dictionary 130 and other data 912 (e.g., data stored while performing the functions described above and data used by the other modules 914). Memory 110 may further include one or more other modules 914, such as an operating system, drivers, communication software, or the like.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 9 as being stored in memory 110 of computing device 900, the modules 112, 114, 116, 118, 120, 122, 124 or portions thereof, may be implemented using any form of computer-readable media that is accessible by computing device 900. As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method under control of one or more processors specifically configured with executable instructions, the method comprising:
   receiving, by a server, a request from a computing device to translate one or more words from a source language to a target language;
   determining that a phrase table excludes a particular word of the one or more words but includes a remainder of the one or more words;
   performing a morphological analysis that includes:
      determining whether the particular word includes one or more affixes;
      in response to determining that the particular word includes one or more affixes, removing the one or more affixes from the particular word; and
      stemming the word to identify the stem of the particular word;
   translating the stem from the source language to the target language to create a translated stem;
   inflecting the translated stem based on the morphological analysis of the particular word to create a translated word corresponding to the particular word;
   translating the remainder of the one or more words from the source language to the target language to create a translated remainder;
   creating a translation of the one or more words based on the translated word and the translated remainder; and
   sending the translation to the computing device.

2. The method as recited in claim 1, further comprising:
   in response to determining that the stem of a second word is unidentifiable by the morphological analysis, determining whether the second word is misspelled;
   in response to determining that the second word is misspelled, modifying a spelling of the second word to create a correctly spelled word; and
   determining whether the morphological analysis of the correctly spelled word identifies the stem.

3. The method as recited in claim 1, further comprising:
   in response to determining that the stem of a third word is unidentifiable by the morphological analysis, determining whether the third word is a colloquial form of a formal word in the source language;
   in response to determining that the third word is the colloquial form, replacing the third word with the formal word; and
   determining whether the morphological analysis of the formal word identifies the stem.

4. The method as recited in claim 1, further comprising:
   in response to determining that the stem of a fourth word is unidentifiable by the morphological analysis, transliterating the fourth word to create a transliterated word; and
   sending the transliterated word to the computing device.

5. The method as recited in claim 1, wherein inflecting the translated stem based on the morphological analysis of the particular word comprises:
   inflecting the translated stem;
   translating the affixes from the source language to the target language to create translated affixes; and
   combining the translated affixes with the translated stem to create the translated word.

6. The method as recited in claim 5, further comprising reordering the translated affixes based on a morphology of the target language after creating the translated affixes.

7. The method as recited in claim 1, further comprising:
   based on a second meaning of the stem, translating the stem from the source language to the target language to create a second translated stem; and
   inflecting the second translated stem to create a second translated word corresponding to the particular word; and
   creating a second translation based on the second translated word.

8. The method as recited in claim 7, further comprising:
   determining a first probability of the translation;
   determining a second probability of the second translation;
   sending the first probability with the translation to the computing device; and
   sending the second probability with the second translation to the computing device.

9. Computer-readable storage media including instructions executable by one or more processors to perform operations comprising:
   receiving, from a computing device, a plurality of words in a source language;
   determining that a phrase table excludes a particular word from the plurality of words but includes one or more words from the plurality of words;
   based on a morphological analysis of the particular word, determining whether the particular word resolves to a stem;
   in response to determining that the stem of the particular word is unidentifiable by the morphological analysis of the particular word, determining whether the particular word is misspelled;
   in response to determining that the particular word is misspelled, modifying a spelling of the word to create a modified word;
   based on the morphological analysis of the modified word, determining whether the modified word resolves to the stem;
   translating the stem from the source language to a target language to create a translated stem;

translating the one or more words from the source language to the target language to create translated one or more words;

creating a translation of the plurality of words based on the translated stem and the translated one or more words; and providing the translation to the computing device.

10. The computer-readable storage media as recited in claim 9, the operations further comprising:

in response to determining that the particular word is irresolvable to the stem, determining whether the particular word is a colloquial form; and in response to determining that the particular word is the colloquial form, modifying the particular word from the colloquial form to a formal form of the particular word before the morphological analysis.

11. The computer-readable storage media as recited in claim 9, wherein the morphological analysis comprises:

determining whether the particular word includes one or more affixes;

modifying the particular word by removing the one or more affixes to create a modified word;

identifying the stem of the modified word;

identifying, based on the modified word, multiple word translations in the target language corresponding to the particular word;

inflecting the multiple word translations;

translating the one or more affixes; and combining the one or more translated affixes with the inflected multiple word translations to create multiple word translations.

12. The computer-readable storage media as recited in claim 11, further comprising reordering the one or more affixes after translating the one or more affixes.

13. The computer-readable storage media as recited in claim 11, further comprising:

ranking the multiple word translations;

determining a context of the particular word based on the plurality of words; and selecting one of the multiple word translations based on the context.

14. A computing device comprising:

one or more processors;

computer-readable storage media including instructions executable by the one or more processors to perform acts comprising:

receiving a request to translate an out-of-vocabulary word from a source language to a target language;

determining whether the out-of-vocabulary word resolves to a stem word based on a morphological analysis;

in response to determining that the out-of-vocabulary word is a colloquial form of a formal word in the source language:

replacing the out-of-vocabulary word with the formal word; and resolving the formal word to the stem word using the morphological analysis;

translating the stem word from the source language to the target language to create a translated stem word; and inflecting the translated stem word based on the morphological analysis to create a translation corresponding to the out-of-vocabulary word.

15. The computing device as recited in claim 14, the acts further comprising:

in response to determining that the out-of-vocabulary word is irresolvable to the stem word, determining whether the out-of-vocabulary word is misspelled; and in response to determining that the out-of-vocabulary word is misspelled, correcting a spelling of the out-of-vocabulary word to create a corrected word;

performing a second morphological analysis of the corrected word;

identifying the stem word corresponding to the corrected word based on the second morphological analysis;

translating the stem word from the source language to the target language; and inflecting the translated stem word based on the morphological analysis to create the translation corresponding to the out-of-vocabulary word.

16. The computing device as recited in claim 14, wherein the morphological analysis comprises:

determining whether the out-of-vocabulary word includes one or more affixes;

removing the one or more affixes from the out-of-vocabulary word to resolve the out-of-vocabulary word to the stem word;

translating the stem word from the source language to the target language to create a translated stem;

inflecting the translated stem;

translating the one or more affixes to create one or more translated affixes; and combining the one or more translated affixes with the translated stem to create the translation corresponding to the out-of-vocabulary word.

17. The computing device as recited in claim 16, further comprising reordering the one or more affixes after translating the one or more affixes based on a grammar associated with the target language.

18. The computing device as recited in claim 14, further comprising:

based on a second meaning of the stem word, translating the stem word from the source language to the target language to create a second translated stem; and inflecting the second translated stem to create a second translated word; and creating a second translation based on the second translated word.

19. The computing device as recited in claim 18, further comprising:

determining a first probability associated with the translation;

determining a second probability associated with the second translation; and creating a ranking of the translation and the second translation based on the first probability and the second probability.

20. The computing device as recited in claim 14, further comprising:

in response to determining that the out-of-vocabulary word is irresolvable to the stem word based on the morphological analysis, transliterating the out-of-vocabulary word.

* * * * *